United States Patent
Outtrabady et al.

(10) Patent No.: US 12,454,105 B2
(45) Date of Patent: Oct. 28, 2025

(54) METHOD FOR MANUFACTURING AN INTER-BLADE PLATFORM WITH SACRIFICIAL EDGES

(71) Applicant: SAFRAN AIRCRAFT ENGINES, Paris (FR)

(72) Inventors: Henri Outtrabady, Moissy-Cramayel (FR); Manon Commarmot, Moissy-Cramayel (FR); Antoine Galve, Moissy-Cramayel (FR); Richard Anandavelou Mounien, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/836,442

(22) PCT Filed: Feb. 1, 2023

(86) PCT No.: PCT/FR2023/050128
§ 371 (c)(1),
(2) Date: Aug. 7, 2024

(87) PCT Pub. No.: WO2023/152436
PCT Pub. Date: Aug. 17, 2023

(65) Prior Publication Data
US 2025/0115009 A1  Apr. 10, 2025

(30) Foreign Application Priority Data
Feb. 10, 2022 (FR) ........................ 2201162

(51) Int. Cl.
*B29C 70/24* (2006.01)
*B29C 70/44* (2006.01)
(Continued)

(52) U.S. Cl.
CPC ............ *B29C 70/24* (2013.01); *B29C 70/443* (2013.01); *D03D 25/005* (2013.01); *F01D 5/147* (2013.01);
(Continued)

(58) Field of Classification Search
CPC .... B29C 70/24; B29C 70/443; D03D 25/005; F01D 5/147
See application file for complete search history.

(56) References Cited

U.S. PATENT DOCUMENTS

| 2014/0334935 A1* | 11/2014 | Dambrine | ............... F01D 5/288 |
| | | | 139/384 R |
| 2018/0117807 A1* | 5/2018 | Marchal | ................ B29C 70/222 |
| 2021/0046671 A1* | 2/2021 | Philippe | ................ C04B 35/447 |

FOREIGN PATENT DOCUMENTS

| CA | 2971426 A1 | 12/2018 |
| FR | 3 047 744 A1 | 8/2017 |

(Continued)

OTHER PUBLICATIONS

Written Opinion of the International Searching Authority as issued in International Patent Application No. PCT/FR2023/050128, dated May 15, 2023.
(Continued)

*Primary Examiner* — Yunju Kim
(74) *Attorney, Agent, or Firm* — Pillsbury Winthrop Shaw Pittman LLP

(57) ABSTRACT

A method for manufacturing an inter-blade platform of a turbomachine fan, the platform including a base including a first and a second sacrificial lateral edge having a thickness smaller than that of the central part of the base, the method including the production of a preform of the platform by three-dimensional weaving including a central part portion and two sacrificial edge portions, the thickness of which is smaller than that of the central part portion, the difference in
(Continued)

thickness between the lateral edge portions and the central part portion being achieved by withdrawing a plurality of weft yarns located outside the central part portion and not being woven with warp yarns.

8 Claims, 4 Drawing Sheets

(51) Int. Cl.
  *B29K 105/08* (2006.01)
  *B29L 31/08* (2006.01)
  *D03D 25/00* (2006.01)
  *F01D 5/14* (2006.01)
(52) U.S. Cl.
  CPC . *B29K 2105/0845* (2013.01); *B29L 2031/082* (2013.01); *D10B 2505/02* (2013.01); *F05D 2230/20* (2013.01); *F05D 2300/6034* (2013.01)

(56) References Cited

FOREIGN PATENT DOCUMENTS

| | | |
|---|---|---|
| FR | 3 097 904 A1 | 1/2021 |
| WO | WO 2006/136755 A2 | 12/2006 |
| WO | WO 2013/088040 A2 | 6/2013 |
| WO | WO-2019197757 A1 * | 10/2019 ............ B28B 1/261 |

OTHER PUBLICATIONS

International Search Report as issued in International Patent Application No. PCT/FR2023/050128, dated May 15, 2023.

* cited by examiner

[Fig. 1]
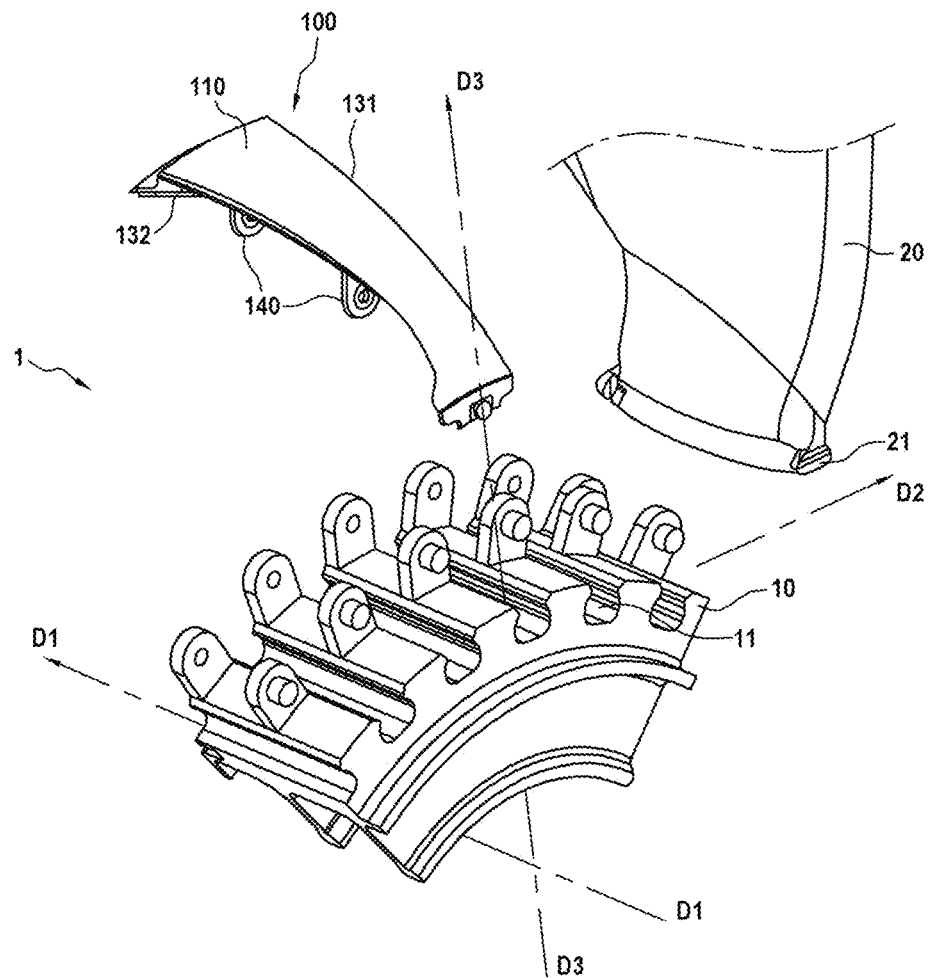
[Fig. 2]
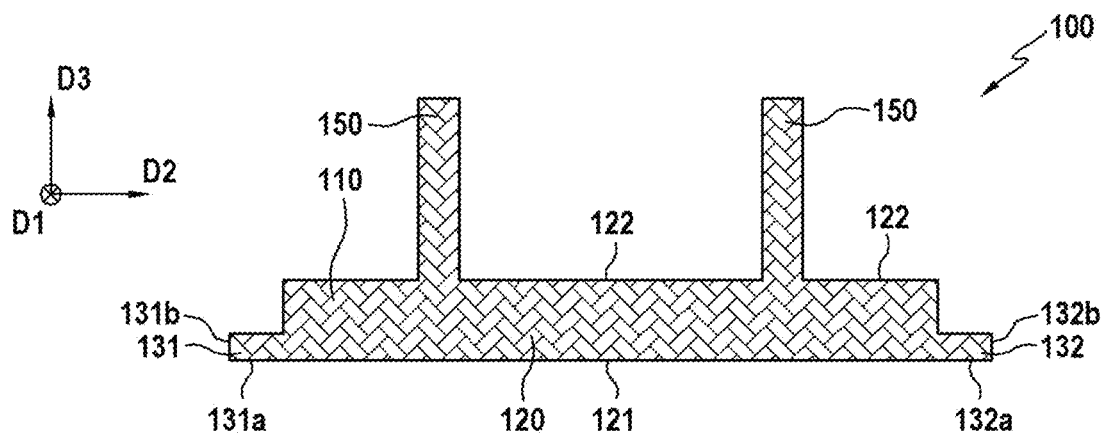

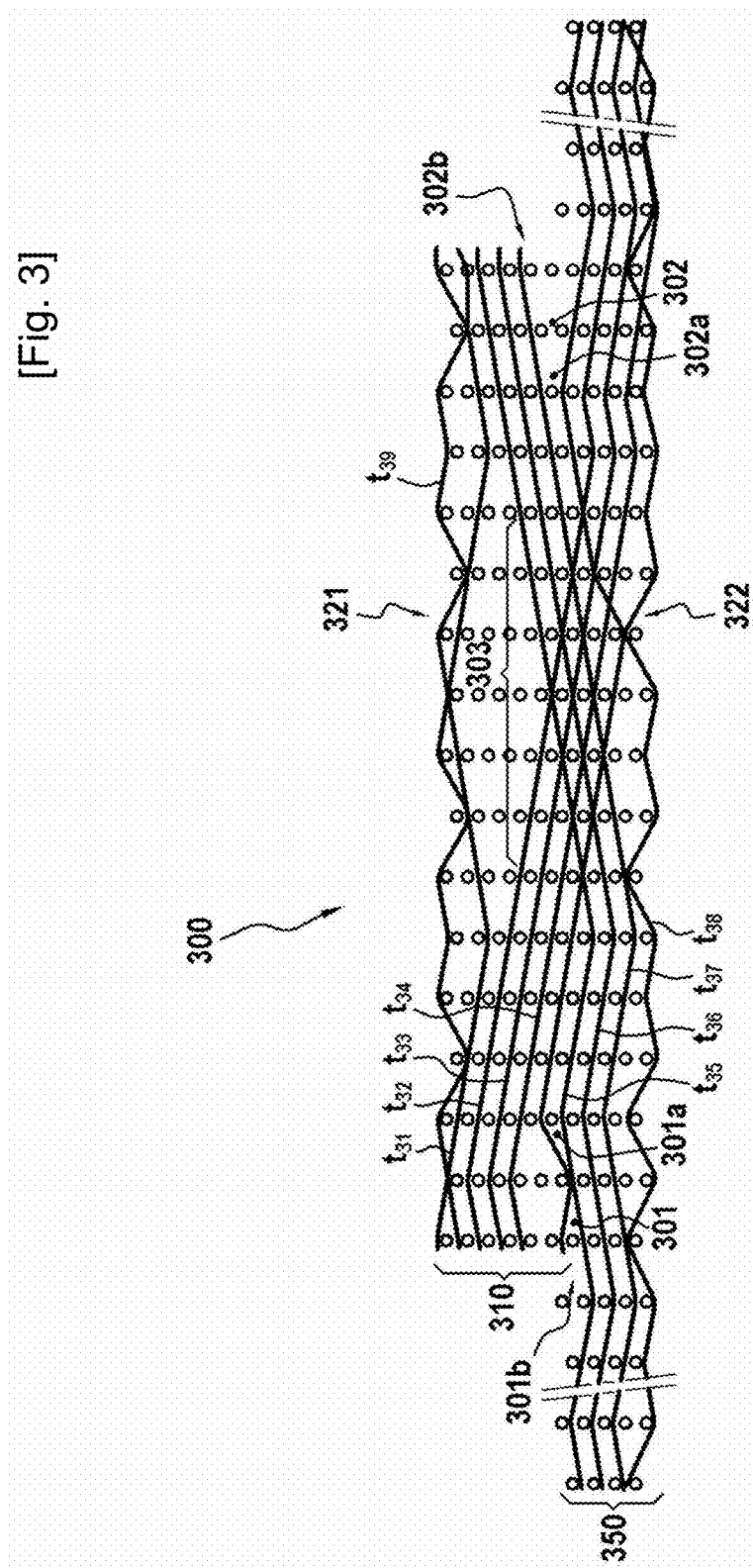
[Fig. 3]

[Fig. 4]
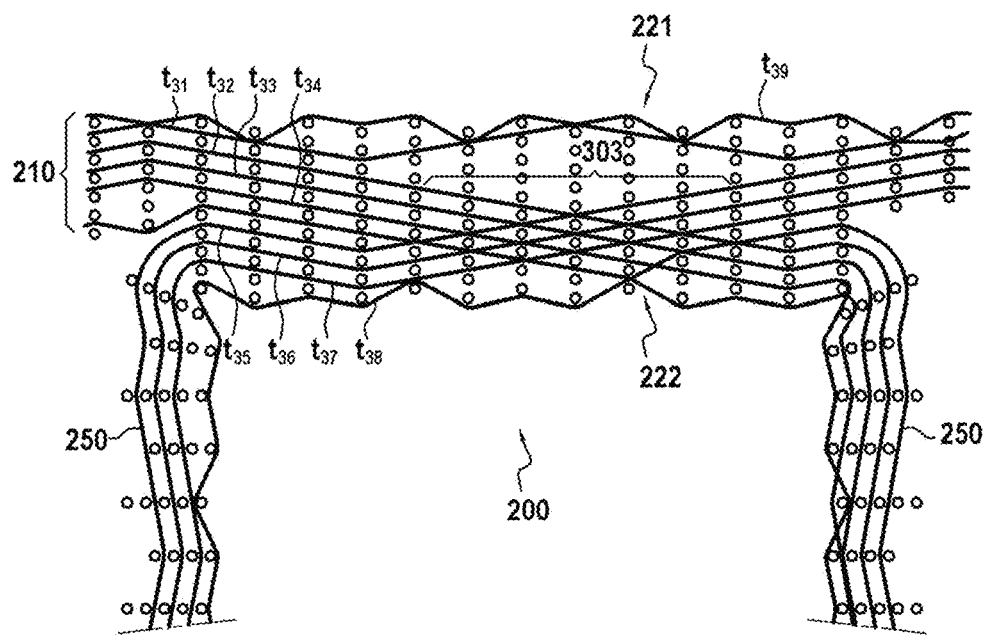
[Fig. 5]
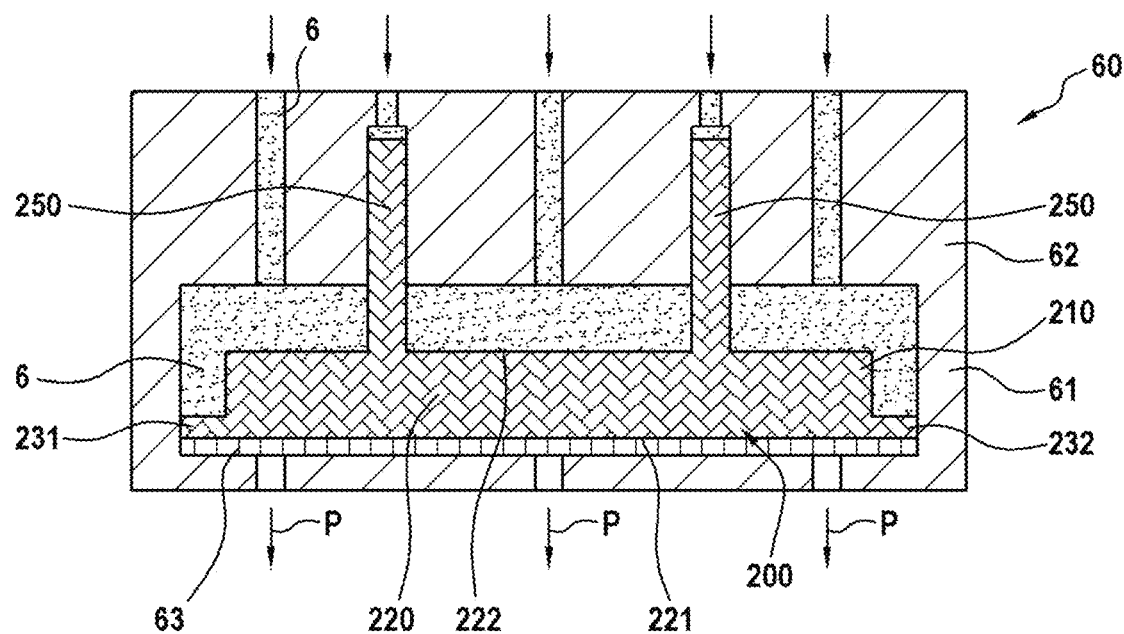

[Fig. 6]
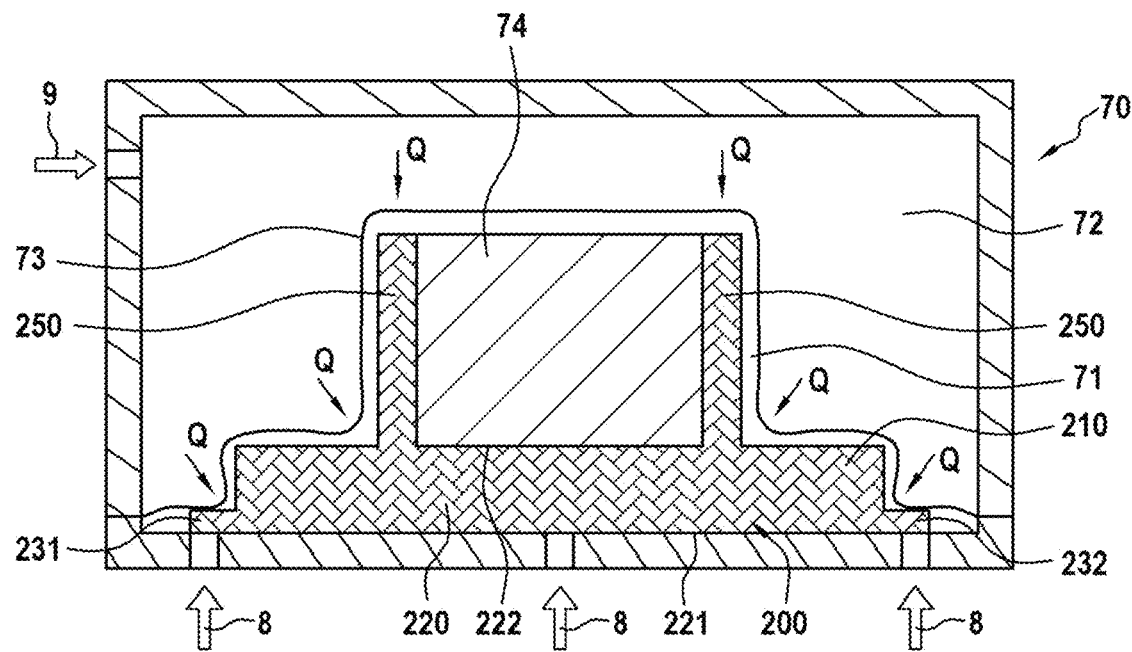

METHOD FOR MANUFACTURING AN INTER-BLADE PLATFORM WITH SACRIFICIAL EDGES

CROSS-REFERENCE TO RELATED APPLICATIONS

This application is the U.S. National Stage of PCT/FR2023/050128, filed Feb. 1, 2023, which in turn claims priority to French patent application number 22 01162 filed Feb. 10, 2022. The content of these applications are incorporated herein by reference in their entireties.

TECHNICAL FIELD

The invention relates to a turbomachine fan, for an airplane turbojet or turboprop for example, and in particular the inter-blade platforms of turbomachine fans.

PRIOR ART

In known fashion, a turbomachine fan comprises a rotor disk including a plurality of blades, separated at their radially inner ends by inter-blade platforms. Thus, the inter-blade platforms of the turbomachine fan are arranged between the blades of the fan in the continuation of the inlet cone thereof. Thus, the turbomachine fan inter-blade platforms are arranged between the blades of the fan in the continuation of the inlet cone thereof. In particular, they allow delimiting, on the inside, the annular air inlet stream in the fan, this stream being delimited on the outside by a casing. These platforms generally comprise a base, configured for delimiting the stream, and tabs extending radially toward the rotor disk. These tabs can form part of a caisson, or correspond to stiffeners.

As the blades are not linked to the platforms, the mechanical stresses to which the blade roots are subjected in operation are strongly reduced. It is then possible to reduce the size of the blade roots to lighten the fan and thus increase the performance of the turbomachine.

The base of the platforms generally comprises sacrificial lateral edges, designed to break in case of a strong pressure from a blade on said sacrificial edges. These sacrificial lateral edges typically have a thickness smaller than the rest of the base. Thus, in the event of loss of a fan blade, the sacrificial edges of the two platforms located on either side of said blade yield, allowing a part of the energy to dissipate and reducing the contact forces between the blade and the platform in order to limit structural damage. In addition, the two platforms allow protecting the surrounding fan blades by preventing possible debris from the lost blade to come into contact with the radially inner ends of these blades. Consequently, the risks of additional damage to the blades and to the platforms of the fan are strongly reduced.

Conventionally, fan platforms are made of composite material, and comprise a fibrous reinforcement densified by a matrix. It is known in particular to produce the fibrous blank in a single piece by three-dimensional or multilayer weaving. The production by three-dimensional weaving of a π (pi)-shaped fibrous blank for a platform is described for example in document WO 2013/088040. Then the preform is densified by a matrix by customary means.

The sacrificial lateral edges are then produced by machining the edges of the base in order to obtain the desired reduction of thickness. This operation of machining the composite material, however, is complex and delicate to implement, in particular for satisfying the quoted dimensions of the part and of surface fitting.

DISCLOSURE OF THE INVENTION

The present invention therefore has as its main purpose to correct the aforementioned disadvantages by facilitating the manufacture of inter-blade platforms.

To this end, the invention proposes a method for manufacturing an inter-blade platform of a turbomachine fan, said platform including a base and at least two tabs, the base comprising a central part comprising a first surface configured to delimit a flow stream of the fan and a second surface, opposite to the first surface, from which said at least two tabs extend radially, the base also comprising a first and a second sacrificial lateral edge extending on either side of the central part of the base and having a thickness smaller than that of the central part of the base, the method comprising the production of a fibrous preform of the platform by three-dimensional weaving in a single part between a plurality of weft yarn layers and a plurality of layers of warp yarn, the method also comprising the densification of the fibrous preform by a matrix to form a part having the shape of the platform to be manufactured, the method being characterized in that the fibrous preform of the platform comprises a base portion intended to form the fibrous reinforcement of the base of the platform, said base portion of the fibrous preform comprising a central part portion and two sacrificial edge portions, the thickness of which is smaller than that of the central part portion, a first plurality of weft yarns being continuous between the central part portion and the sacrificial edge portions, the sacrificial edge portions comprising a first plurality of warp yarns woven to the first plurality of weft yarns, the difference in thickness between the lateral edge portions and the central part portion being achieved by withdrawing a second plurality of warp yarns located outside the central part portion and not being woven with the weft yarns.

Thus the manufacture of inter-blade platforms is simplified by densifying a fibrous preform already having a shape substantially identical to the part to be manufactured. Consequently a complex machining step is dispensed with, thus also limiting material losses, while ensuring satisfaction of the quoted dimensions.

According to a particular feature of the invention, the densification of the fibrous preform is accomplished by arranging the fibrous preform in the impregnation chamber of a mold comprising a lower face, by having the surface of the fibrous preform intended to form the first surface of the central part of the base of the platform rest on said lower face, the impregnation chamber being closed by a flexible membrane separating said impregnation chamber from a compaction chamber, an impregnation fluid being injected into the impregnation chamber and a compression fluid being injected into the compaction chamber so as to apply pressure on the membrane.

The impregnation fluid can for example be a slurry comprising particles of matrix precursor, or a resin.

The techniques of injection below a membrane allow greater flexibility for the geometry of the injection mold. In fact, the use of a flexible membrane instead of a rigid counter-mold, as is the case in the RTM techniques, allows in particular adapting it more easily to the particular geometry of the tabs. In addition, the techniques of injection below a membrane also allow better control of the fiber volume ratio, because exactly the desired volume of resin is introduced to obtain an accurate and predefined fiber volume ratio.

According to another particular feature of the invention, the injection of the impregnation fluid is accomplished before the injection of the compression fluid.

According to another particular feature of the invention, the injection of the compression fluid begins before the injection of the impregnation fluid.

In this variant, improved control of the flow of the impregnation fluid, and consequently of the impregnation of the fibrous preform, is obtained.

According to another particular feature of the invention, the injection of the compaction liquid begins before the injection of the impregnation fluid.

The latter variant advantageously allows applying pressure on the fibrous preforms, the value of which allows obtaining the desired fiber volume ratio even before the impregnation fluid is injected. The injection of the impregnation fluid, which can be accomplished while continuing to inject the compression fluid in order to compensate for head losses, particularly in the case where the impregnation fluid is a slurry, is then started.

BRIEF DESCRIPTION OF THE DRAWINGS

FIG. 1 is a partial exploded schematic view of an example of a fan comprising inter-blade platforms.

FIG. 2 is a section view of the inter-blade platform shown in FIG. 1.

FIG. 3 is a partial schematic view of a plan of a fibrous blank of the platform produced by three-dimensional weaving.

FIG. 4 is a partial schematic view of a plan of a fibrous preform obtained by forming the fibrous blank of FIG. 3.

FIG. 5 is a schematic section view of the fibrous preform of the platform in a rigid injection tooling.

FIG. 6 is a schematic section view of the fibrous preform of the platform in a tooling comprising a flexible membrane.

DESCRIPTION OF THE EMBODIMENTS

FIG. 1 illustrates a turbomachine fan 1, in exploded view, comprising a rotor disk 10 carrying a plurality of fan blades 20, the roots 21 of the blades 20 being engaged in axial grooves 11 formed in the rotor disk 10. The blades 20 are separated by inter-blade platforms 100 attached to the rotor disk 10.

A first direction $D_1$ is defined, which corresponds to the general direction of the flow of the gases of the turbomachine. Also defined is a second tangential and/or circumferential direction $D_2$, which corresponds to the direction of the alternate succession of the inter-blade platforms 100 and of the blades. Finally, a third radial direction $D_3$ is defined, perpendicular to the first direction.

For reasons of simplification, the first, second and third directions of the reference frame of the fan are also used for the reference frame of the platform, the direction of the reference frame of the platform corresponding to the directions of the reference frame of the fan when said platform is mounted on said fan.

The inter-blade platform 100 illustrated in FIGS. 1 and 2 comprises a base 110, comprising a central part 120 as well as a first sacrificial lateral edge 131 and a second sacrificial lateral edge 132. The central part 120 of the base 110 has opposite first surface 121 and second surface 122. The first surface 121 is intended to delimit a flow stream of the fan.

When the platform 100 is mounted on the fan, the first surface 121 and the second surface 122 extend lengthwise in the first direction $D_1$, i.e. in the general direction of flow of the gas of the turbomachine, and extending in width in the second direction $D_2$ between the two adjacent blades flanking the platform 100.

The platform 100 also comprises at least two tabs 150 extending radially from the second surface 122 of the central part 120 of the base 110 and being able to fulfill the function of stiffeners. When the platform 100 is mounted on the fan, the tabs 150 extend in the third direction $D_3$, toward the rotor disk. The tabs 150 also extend lengthwise along the first surface 121 and the second surface 122. Thus, when the platform 100 is mounted on the fan, the tabs 150 extend in the first direction $D_1$, i.e. in the general direction of flow of the gas of the turbomachine.

The first sacrificial lateral edge 131 and the second sacrificial lateral edge 132 extend on either side of the central part 120 of the base 110 of the platform 100, lengthwise along the first surface 121 and the second surface 122. The first sacrificial lateral edge 131 and the second sacrificial lateral edge 132 are therefore joined at the central part 120 of the base 110 of the platform 100.

Preferably, the first sacrificial lateral edge 131 and the second sacrificial lateral edge 132 each respectively comprise a continuation surface 131a and 132a located in the continuation of the first surface 121 of the central part 120 in the second direction $D_2$. Preferably, the length of the continuation surface 131a, 132a in the second direction $D_2$ is comprised between 6 mm and 11 mm.

The first sacrificial edge 131 and the second sacrificial edge 132 have a thickness in the third direction $D_3$ that is smaller than the thickness of the central part 120 of the base 110 in the third direction $D_3$. Preferably, the thickness of the first and second sacrificial edges 131 and 132 is comprised between 1.5 mm and 2.2 mm.

Preferably, the thickness in the third direction $D_3$ of the first and second sacrificial edges 131, 132 at their free ends 131b, 132b is less than or equal to 2.2 mm. The manufacture of the inter-blade platform 100 comprises the production of a fibrous preform 200 of the platform 100 by three-dimensional weaving between a plurality of warp yarn layers and a plurality of weft yarn layers. What is meant here by "three-dimensional weaving" or "3D weaving" is a weaving method by which at least certain of the warp yarns link weft yarns over several weft layers. An inversion of roles between warp and weft is possible. The fibrous preform can, for example, have a multi-satin weave, i.e. a fabric obtained by three-dimensional weaving with several weft yarn layers, in which the base weave of each layer is equivalent to a conventional satin weave but with certain points of the weave which link the weft yarn layers together.

The fibrous preform can also, for example have an interlock weave, i.e. a fabric obtained by three-dimensional weaving in which each warp yarn layer links several weft yarn layer with all the yarns of the same warp column having the same movement in the plan of the weave.

Other three-dimensional weaving methods are practicable, such as for example weaving with a multi-web weave. Different multilayer weaving methods usable for forming the fibrous preform are described in document WO 2006/136755.

The fibrous preform 200 comprises tab portions 250 intended to form the fibrous reinforcement of the tabs 150 of the platform 100, and a base portion 210 intended to form the reinforcement of the base 110 of the platform 100. In particular, the base portion 210 of the fibrous preform 200 comprises a central part portion 220 intended to form the fibrous reinforcement of the central part 120 of the base 110 of the platform 100, as well as a first portion and a second portion of sacrificial lateral edges 231 and 232 intended to form respectively the fibrous reinforcement of the first and of the second sacrificial lateral edges 131 and 132. The central part portion 220 comprises a first surface 221 and a second surface 222, respectively intended to form the first surface 121 and the second surface 122 of the central part 120 of the base 110 of the platform 100.

In order to produce a fibrous preform 220 of the platform 100, it is possible to begin by producing a fibrous blank 300 of said platform 100 by three-dimensional weaving.

The sacrificial edge portions 231 and 232 are produced according to the method called "layer exit." A fibrous blank 300 of the fibrous preform 200 is produced by means of a jacquard type loom. A loom of this type is described for example in document FR 3 047 744 A1. By means of such a loom, it is possible to directly weave the blanks of sacrificial edge portions of which the thickness is different from the blank of the central part portion.

Thus, in the fibrous blank 300, a first plurality of weft yarn layers is continuous between the blank of the central part portion and the two blanks of the sacrificial lateral edges, i.e. a first plurality of weft yarns passes through both the blank of the central part portion and the two blanks of the sacrificial lateral edges. Consequently, in the fibrous preform 200, the first plurality of weft yarn layers is continuous between the central part portion 220 and the two sacrificial lateral edge portions 231 and 232, i.e. the first plurality of weft yarns passes through both the central part portion 220 and the two sacrificial lateral edge portions 231 and 232.

The blank of the central part portion comprises a plurality of warp yarn layers which is woven with a plurality of weft yarn layers. In particular, the plurality of warp yarns is woven with the first plurality of weft yarns and with a second plurality of weft yarn layers, i.e. the warp yarns belonging to the blank of the central part portion are woven with the first plurality of weft yarns and with a second plurality of weft yarns. Consequently, in the fibrous preform 200, the plurality of warp yarn layers is woven with the first plurality of weft yarn layers and with the second plurality of weft yarn layers, i.e. the warp yarns belonging to the central part portion 220 are woven with the first plurality of weft yarns and with the second plurality of weft yarns.

The blank of the sacrificial lateral edge portion comprises a first plurality of warp yarn layers which is woven with the first plurality of weft yarn layers, i.e. a first plurality of warp yarns is woven with the first plurality of weft yarns within the blank of the sacrificial lateral edge portion. The same woven structure is used for the other blank of the sacrificial lateral edge portion. Consequently, in the fibrous preform 200, the sacrificial lateral edge portion 232 comprises the first plurality of warp yarn layers which is woven with the first plurality of weft yarn layers, i.e. the first plurality of warp yarns is woven with the first plurality of weft yarns within the sacrificial lateral edge portion 232. The same woven structure is used for the other sacrificial lateral edge portion 231.

The difference in thickness between the blank of the central part portion and the two blanks of the sacrificial lateral edge portions is accomplished by withdrawing a second plurality of warp yarns located on either side of the blank of the central part portion and distinct from the first plurality of warp yarns. In particular, a warp yarn belonging to the second plurality of warp yarns cannot belong to the first plurality of warp yarns, and conversely. Thus, the second plurality of warp yarns corresponds to the assembly of warp yarns located outside the blank of the central part portion and not being woven to the first plurality of weft yarns.

In order to allow the withdrawal of the second plurality of warp yarns, the second plurality of warp yarns is not woven with weft yarns. Thus, the second plurality of warp yarns is not woven with the first plurality of weft yarns and is not woven with the second plurality of weft yarns.

Thus, the second plurality of weft yarns is woven only with the warp yarns present in the blank of the central part portion. Consequently, in the fibrous preform 200, the second plurality of weft yarns is woven only with the warp yarns present in the central part portion 220. The second plurality of weft yarns therefore corresponds to the weft yarns which are not woven with the first plurality of warp yarns.

When the weaving of the fibrous blank 300 is completed, the two yarn portions belonging to the second plurality of weft yarns not being woven with the blank of the central part portion are cut out.

In parallel with the production of the lateral edge portions 231 and 232, the tab portions 250 of the fibrous preform 200 can [be] produced by means of de-bonding. FIG. 3 shows an example of a partial schematic plan of the fibrous blank 300 of the platform 100 comprising in its thickness a blank of the base portion 310 and a blank of the tab portion 350 separated from one another over a part of the dimension of the fibrous blank 300 in the weft direction by a first de-bonding 301 and a second de-bonding 302. The de-bondings 301 and 302 extend from opposite edges 301b, 302b of the fibrous blank 300 to de-bonding floors 301a, 302a, the center of the fibrous blank 300 having no de-bonding. The base portion blank 310 has a first surface 321 and a second surface 322, intended respectively to form the first surface 221 and the second surface 222 of the central part portion 220 of the fibrous preform 220.

Each base portion 310 or tab 350 blank of the fibrous blank 300 includes a plurality of warp yarn layers, the numbers of warp yarn layers in the base portion 310 and tabs 350 blanks being different here.

In each plan of the fibrous blank 300, the same weft yarns $t_{31}$, $t_{32}$, $t_{33}$, $t_{34}$ link together warp yarns in the tab portion blank 350 beyond the second de-bonding 302 as well as warp yarns in the part of the base portion blank 310 bordering the first de-bonding 301. On the other hand, same weft yarns $t_{35}$, $t_{36}$, $t_{37}$, $t_{38}$ link together warp yarns in the part of the base portion blank 310 bordering the second de-bonding 302 and warp yarns in the tab portion blank 350 below the first de-bonding 301.

Thus the trajectories of the first-weft yarns $t_{31}$, $t_{32}$, $t_{33}$, $t_{34}$ cross those of the weft yarns $t_{35}$, $t_{36}$, $t_{37}$, $t_{38}$ in a transition zone 303 located in the center of the fibrous blank 300, between the floors 301a and 302a of the de-bondings 301 and 302.

Noted at the first surface 321 of the base portion blank 310 is weaving with a surface satin weave represented by the yarn $t_{39}$ providing surface continuity without passing through layers of warp yarns and without crossing another weft yarn.

The weaves shown in FIGS. 3 and 4 are block diagrams, and therefore represent a number of warp yarns and a number of weft yarns that are less than the real numbers of warp yarns and of weft yarns.

The fibrous blank 300 of the platform 100 is then formed as illustrated in FIG. 4 to obtain a fibrous preform 200 of the body 100 with a cross section substantially shaped like a π(pi), by folding the tab portion blank 350 at the debondings 301 and 302 so as to form the tab portions 250.

Preferably, the length and the width of the first surface 221 of the central part portion 220, the length of the tab portions 250 and the spacing between the two tab portions 250 correspond substantially respectively to the length and to the width of the first surface of the central part 120, to the length of the tabs 130 and to the spacing between the two tabs 130 of the platform 100.

Document WO 2013/088040 describes in particular examples of fibrous blank plans which can be used to produce a fibrous platform preform with tabs.

Preferably, the fibrous preform 200 corresponds to a "dry," i.e. not impregnated with a resin or the like, fibrous structure. The fibrous preform 200 can include a plurality of yarns of various types, in particular ceramic or carbon yarns or even a mixture of such yarns. Preferably, the fibrous preform 200 can be produced from silicon carbide fibers. Generally, the fibrous preform 200 can also be produced from fibers consisting of the following materials: alumina, mullite, silica, an aluminosilicate, a borosilicate, carbon, or a mixture of several of these materials.

Once the fibrous preform 200 of the platform 100 is obtained, said fibrous preform 200 is densified by a matrix, in order to form a part comprising a fibrous reinforcement constituted by the fibrous preform 200.

The densification can be accomplished in a well-known manner by resin transfer molding (RTM), or by slurry transfer molding (STM). As illustrated in FIG. 5, the fibrous preform 200 intended to form the fibrous reinforcement of the platform 100 is arranged in a cavity defined by a first part 61 and a second part 62 of a mold 60. The cavity has the shape of the part to be manufactured, the latter having overall the shape of the platform 100 to be manufactured.

Conventionally a slurry 6 of particles of matrix precursors or a resin is injected into the cavity accommodating the fibrous preform 200, in order to pass through said fibrous preform 200 due to the application of a pressure gradient P. The mold 6 into which the injection of the slurry is carried out comprises a filter 63 at the exit opening of the slurry 6 in the mold 60, thus allowing retaining the possible particles of matrix precursor in the mold 60 and to impregnate the fibrous preform 200 progressively during the deposition of the particles of matrix precursor into the mold 60, in the case of a slurry.

The densification can also be accomplished in a well-known manner by injection below a membrane, as illustrated in FIG. 6. This injection method allows complete control of the quantity of resin or of slurry injected, thus ensuring an accurate and suitable fiber volume ratio. Consequently, the features of the part thus manufactured are improved, with low variability from one part to another.

The fibrous preform 200 intended to form the fibrous reinforcement of the platform 100 is deposited into a mold 70. In particular, the fibrous preform 200 can be deposited directly onto the lower face of the impregnation chamber 71. This lower face of the impregnation chamber 71 can comprise a filter (not shown in FIG. 6).

The mold 70 comprises, on the one hand, an impregnation chamber 71 into which is deposited the fibrous preform 200 in order to be densified by a matrix through the injection of an impregnation fluid 8, and on the other hand a compaction chamber 72 into which a compression fluid 9 is injected in order to apply pressure on the preform 200 during its densification by the matrix. The impregnation chamber 71 and the compaction chamber 72 are separated by a flexible membrane 73. The membrane 73 allows applying pressure on the fibrous preform 200 installed in the impregnation chamber 71, the compression fluid 9 applying a pressure Q on the membrane 73 which deforms and thus applies pressure in its turn on the fibrous preform 200.

Preferably, and as illustrated in FIG. 6, the membrane conforms to the tab portions 250 of the fibrous preform 200 and the second surface 222 of the central part portion 220, while the first surface 221 of the central part portion 220 rests against one of the walls of the impregnation chamber 71, opposite to the membrane 73. An insert 74 can be used to facilitate the impregnation of the fibrous preform 200 of the platform 100.

The flexible membrane 73 is for example made of silicone.

As shown in FIG. 6, it is possible for example to inject a resin 8 through an inlet opening leading into the impregnation chamber 71, and inject the compression liquid 9 through an inlet opening leading into the compaction chamber 72.

Depending on the size, the thickness and the shape of the platform 100 to be fabricated, a different injection sequence of the compression and impregnation fluids will be favored.

For example, it is possible to begin by injecting the impregnation fluid, a resin for example, into the impregnation chamber where the fibrous preforms are deposited. Once the injection of the impregnation fluid is complete, the compression fluid, water for example, is injected into the compaction chamber so as to exert pressure on the flexible membrane. The flexible membrane thus applies pressure to the fibrous preform, allowing the impregnation fluid to penetrate into said preform.

The preform is then subjected to a thermal treatment while the pressure exerted by the membrane is maintained, in order to form a matrix in the porosities of the fibrous preform.

According to another example, it is possible to start by injecting the compression fluid into the compaction chamber. Thus, even before the injection of the impregnation fluid, pressure is already applied to the fibrous preform through the flexible membrane, the value of which allows obtaining the desired fiber volume ratio. The injection of the impregnation fluid is then started, which can be accomplished while continuing to inject the compression fluid in order to compensate for head losses, particularly in the case where the injection fluid is a slurry. An injection sequence of this type is for example described in document WO 2019/197757 A1.

When the densification step is completed, a part made of composite material is obtained in which the fibrous reinforcement is constituted by the fibrous preform 200, and the shape of which corresponds overall to the inter-blade platform 100 to be manufactured. A trimming or light machining step can be carried out on the produced part to obtain the inter-blade platform 100 to be manufactured. In addition, other elements can be mounted or welded to the produced part to obtain the inter-blade platform 100 to be manufactured, particularly elements 140 for fastening to the rotor disk as shown in FIG. 1.

The expression "comprised between . . . and . . . " must be understood as including the limits.

The invention claimed is:

1. A method for manufacturing an inter-blade platform of a turbomachine fan, said platform including a base and at least two tabs, the base comprising a central part comprising a first surface configured to delimit a flow stream of the fan and a second surface, opposite to the first surface, from which said at least two tabs extend radially, the base also comprising a first and a second sacrificial lateral edge extending on either side of the central part of the base and having a thickness smaller than that of the central part of the base, the first and second sacrificial lateral edges forming a weakened region adapted to break in response to pressure from a blade on said sacrificial lateral edges, the method comprising producing a fibrous preform of the platform by three-dimensional weaving in a single part between a plurality of weft yarn layers and a plurality of warp yarn layers, the method also comprising densifying the fibrous preform by a matrix to form a part having the shape of the platform to be manufactured, wherein the fibrous preform of the platform comprises a base portion intended to form the fibrous reinforcement of the base of the platform, said base portion of the fibrous preform comprising a central part portion and two sacrificial edge portions, a thickness of which is less than that of the central part portion, the warp yarns belonging to the central part portion being woven with a first plurality of weft yarns and with a second plurality of weft yarns, the first plurality of weft yarns being continuous between the central part portion and the sacrificial edge portions, the sacrificial edge portions comprising a first plurality of warp yarns woven to the first plurality of weft yarns, a difference in thickness between the lateral edge portions and the central part portion being achieved by withdrawing a second plurality of warp yarns located outside the central part portion, the second plurality of warp yarns not being woven with the first plurality of weft yarns and not being woven with the second plurality of weft yarns.

2. The manufacturing method according to claim 1, wherein the densification of the fibrous preform is accomplished by arranging the fibrous preform in an impregnation chamber of a mold comprising a lower face, by having the surface of the fibrous preform intended to form the first surface of the central part of the base of the platform rest on said lower surface of the fibrous preform, the impregnation chamber being closed by a flexible membrane separating said impregnation chamber from a compaction chamber, an impregnation fluid being injected into the impregnation chamber and a compression fluid being injected into the compaction chamber so as to apply pressure on the membrane.

3. The method according to claim 2, wherein the injection of the impregnation fluid begins before the injection of the compression fluid.

4. The method according to claim 2, wherein the injection of the compression fluid begins before the injection of the impregnation fluid.

5. The method according to claim 1, wherein yarn portions belonging to the second plurality of weft yarns not being woven with the central part portion are cut out after the weaving is completed in order to achieve the difference in thickness between the lateral edge portions and the central part portion.

6. The method according to claim 1, wherein the first surface and the second surface extend in width in a second circumferential direction, the first and second sacrificial lateral edges extending on either side of the central part of the base along the second circumferential direction, the first and second sacrificial lateral edges each respectively comprising a continuation surface located in the continuation of the first surface of the central part in the second circumferential direction.

7. The method according to claim 6, wherein the length of the continuation surface of the first and second sacrificial lateral edges in the second circumferential direction is comprised between 6 mm and 11 mm.

8. The method according to claim 1, wherein the thickness of the first and second sacrificial edges is comprised between 1.5 mm and 2.2 mm.

* * * * *